United States Patent
Pak et al.

(10) Patent No.: US 7,839,392 B2
(45) Date of Patent: Nov. 23, 2010

(54) SENSING CIRCUIT AND DISPLAY DEVICE HAVING THE SAME

(75) Inventors: Sang-Jin Pak, Yongin-si (KR);
Young-Jun Choi, Suwon-si (KR);
Man-Seung Cho, Seoul (KR);
Joo-Hyung Lee, Gwacheon-si (KR);
Myung-Woo Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1218 days.

(21) Appl. No.: 11/440,184

(22) Filed: May 24, 2006

(65) Prior Publication Data
US 2007/0030255 A1    Feb. 8, 2007

(30) Foreign Application Priority Data
Aug. 5, 2005   (KR) ...................... 10-2005-0071552
Aug. 5, 2005   (KR) ...................... 10-2005-0071553
Aug. 5, 2005   (KR) ...................... 10-2005-0071554

(51) Int. Cl.
*G09G 5/00* (2006.01)
(52) U.S. Cl. ...................................................... 345/173
(58) Field of Classification Search .......... 345/173–176
See application file for complete search history.

(56) References Cited

U.S. PATENT DOCUMENTS 6,025,726 A  *  2/2000  Gershenfeld et al. ........ 324/671
2002/0190964 A1 * 12/2002 Van Berkel .................. 345/173

* cited by examiner

*Primary Examiner*—Henry N Tran
*Assistant Examiner*—Christopher E Leiby
(74) *Attorney, Agent, or Firm*—F. Chau & Associates, LLC

(57) ABSTRACT

A sensing circuit is provided that senses an externally provided pressure on a panel, and includes a sensing capacitor, a first switching element, a second switching element and a third switching element; where the sensing capacitor includes a sensing electrode on the first substrate, the insulating layer and the opposite electrode; the sensing capacitor varies a capacitance based on the externally provided pressure; the first switching element is electrically connected to the sensing electrode to charge the sensing capacitor based on a first switching signal; the second switching element outputs a current based on a second switching signal and a first voltage; the third switching element is electrically connected to the sensing electrode to control the current based on the variation of the capacitance of the sensing capacitor to generate a sensing signal; and where a thickness is decreased, and an image display quality is improved.

14 Claims, 12 Drawing Sheets

SENSING CIRCUIT AND DISPLAY DEVICE HAVING THE SAME

CROSS-REFERENCE TO RELATED APPLICATIONS

The present application claims foreign priority under 35 U.S.C. §119 to Korean Patent Application No. 2005-71552, filed on Aug. 5, 2005, Korean Patent Application No. 2005-71553, filed on Aug. 5, 2005, and Korean Patent Application No. 2005-71554, filed on Aug. 5, 2005, the disclosures of which are herein incorporated by reference in their entireties.

BACKGROUND OF THE INVENTION

1. Field of the Invention

The present disclosure relates to touch-sensing displays. More particularly, the present disclosure relates to a sensing circuit capable of sensing an externally provided pressure and a display device having the sensing circuit.

2. Description of the Related Art

Generally, a touch panel senses a pressure formed by a finger or a pointer on a display device. The touch panel is on an uppermost portion of the display panel. The touch panel detects a location of the finger or the pointer so that the display device generates an output signal.

The touch panel is capable of reading data without a keyboard or a mouse. Therefore, the touch panel has been widely used. Unfortunately, when the display device includes the touch panel, a thickness of the display device is increased.

SUMMARY OF THE INVENTION

The present disclosure provides a sensing circuit capable of sensing an externally provided pressure. The present disclosure also provides a display device having the sensing circuit.

A sensing circuit in accordance with one exemplary embodiment of the present disclosure senses an externally provided pressure on a panel. The panel includes a first substrate, a second substrate corresponding to the first substrate to have an opposite electrode and an insulating layer interposed between the first and second substrates. The sensing circuit includes a sensing capacitor, a first switching element, a second switching element and a third switching element. The sensing capacitor includes a sensing electrode on the first substrate, the insulating layer and the opposite electrode. The sensing capacitor varies a capacitance based on the externally provided pressure. The first switching element is electrically connected to the sensing electrode to charge the sensing capacitor based on a first switching signal. The second switching element outputs a current based on a second switching signal and a first voltage. The third switching element is electrically connected to the sensing electrode to control the current outputted from the second switching element based on the variation of the capacitance of the sensing capacitor to generate a sensing signal corresponding to the externally provided pressure.

A sensing circuit in accordance with another exemplary embodiment of the present disclosure senses an externally provided pressure on a panel. The panel includes a first substrate, a second substrate corresponding to the first substrate to have an opposite electrode and an insulating layer interposed between the first and second substrates. The sensing circuit includes a sensing capacitor, a first switching element, a second switching element and a third switching element. The sensing capacitor includes a sensing electrode on the first substrate, the insulating layer and the opposite electrode. The sensing capacitor varies a capacitance based on the externally provided pressure. The first switching element is electrically connected to the sensing electrode to charge the sensing capacitor based on a first switching signal. The second switching element is electrically connected to the sensing electrode to generate a first current based on the variation of the capacitance of the sensing capacitor. The third switching element is electrically connected to the second switching element to output a second current that has a constant level, thereby generating a third current corresponding to a variation of the first current.

A sensing circuit in accordance with still another exemplary embodiment of the present disclosure senses an externally provided pressure on a panel. The panel includes a first substrate, a second substrate corresponding to the first substrate to have an opposite electrode and an insulating layer interposed between the first and second substrates. The sensing circuit includes a sensing capacitor, a first switching element, a second switching element and a third switching element. The sensing capacitor includes a sensing electrode on the first substrate, the insulating layer and the opposite electrode. The sensing capacitor varies a capacitance based on the externally provided pressure. The first switching element is electrically connected to the sensing electrode to charge the sensing capacitor based on a first switching signal. The second switching element is electrically connected to the sensing electrode to generate a current based on the variation of the capacitance of the sensing capacitor. The third switching element controls the current outputted from the second switching element based on a second switching signal.

A display device in accordance with one exemplary embodiment of the present disclosure includes a display panel, a sensing array and a controlling part. The display panel includes an array substrate, an opposite substrate and a liquid crystal layer. The opposite substrate corresponds to the array substrate to have a common electrode receiving a common voltage. The liquid crystal layer is interposed between the array substrate and the opposite substrate, the liquid crystal layer varying a thickness based on an externally provided pressure on the display panel. The sensing array is in the display panel to generate a sensing signal based on the variation of the thickness of the liquid crystal layer. The sensing array includes a sensing capacitor, a first switching element, a second switching element and a third switching element. The sensing capacitor includes a sensing electrode on the array substrate, the liquid crystal layer and the common electrode. The sensing capacitor varies a capacitance based on the variation of the thickness of the liquid crystal layer. The first switching element is electrically connected to the sensing electrode to charge the sensing capacitor based on a first switching signal. The second switching element outputs a current based on a second switching signal and a first voltage. The third switching element is electrically connected to the sensing electrode to control the current outputted from the second switching element based on the variation of the capacitance of the sensing capacitor to generate the sensing signal. The controlling part is on the array substrate to generate location data based on the sensing signal.

A display device in accordance with another exemplary embodiment of the present disclosure includes a display panel, a sensing array and a controlling part. The display panel includes an array substrate, an opposite substrate and a liquid crystal layer. The opposite substrate corresponds to the array substrate to have a common electrode receiving a common voltage. The liquid crystal layer is interposed between the array substrate and the opposite substrate. The liquid crystal layer varies a thickness based on an externally provided pressure on the display panel. The sensing array is in the display panel to generate a sensing signal based on the variation of the thickness of the liquid crystal layer. The sensing array includes a sensing capacitor, a first switching element, a second switching element and a third switching element. The sensing capacitor includes a sensing electrode on the array substrate, the liquid crystal layer and the common electrode. The sensing capacitor varies a capacitance based on the variation of the thickness of the liquid crystal layer. The first switching element is electrically connected to the sensing electrode to charge the sensing capacitor based on a first switching signal. The second switching element is electrically connected to the sensing electrode to generate a first current based on the variation of the capacitance of the sensing capacitor. The third switching element is electrically connected to the second switching element to output a second current that has a constant level, thereby generating the sensing signal corresponding to a variation of the first current. The controlling part is on the array substrate to generate location data based on the sensing signal.

A display device in accordance with still another exemplary embodiment of the present disclosure includes a display panel, a sensing array and a controlling part. The display panel includes an array substrate, an opposite substrate and a liquid crystal layer. The opposite substrate corresponds to the array substrate to have a common electrode receiving a common voltage. The liquid crystal layer is interposed between the array substrate and the opposite substrate. The liquid crystal layer varies a thickness based on an externally provided pressure on the display panel. The sensing array is in the display panel to generate a sensing signal based on the variation of the thickness of the liquid crystal layer. The sensing array includes a sensing capacitor, a first switching element, a second switching element and a third switching element. The sensing capacitor includes a sensing electrode on the array substrate, the liquid crystal layer and the common electrode. The sensing capacitor varies a capacitance based on the thickness of the liquid crystal layer. The first switching element is electrically connected to the sensing electrode to charge the sensing capacitor based on a first switching signal. The second switching element is electrically connected to the sensing electrode to generate the sensing signal based on the variation of the capacitance of the sensing capacitor. The third switching element controls the sensing signal outputted from the second switching element based on a second switching signal. The controlling part is on the array substrate to generate location data based on the sensing signal.

According to the present disclosure, the display panel includes the sensing array that detects the externally provided pressure on the display panel so that the display panel performs the touch panel function.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF PREFERRED EMBODIMENTS

Figure 1:
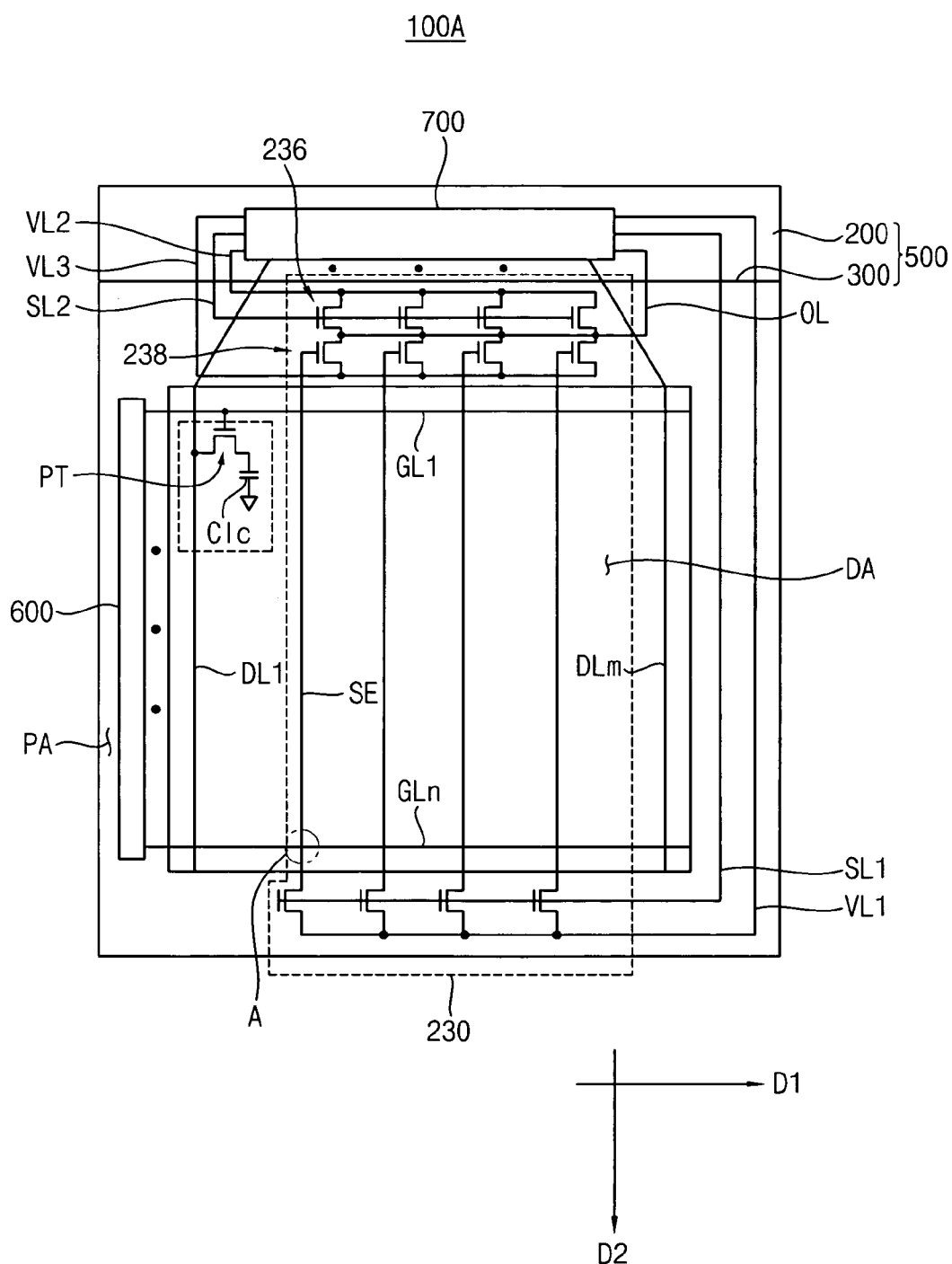
FIG. 1 is a plan view showing a display device in accordance with one embodiment of the present disclosure.

The disclosure is described more fully hereinafter with reference to the accompanying drawings, in which exemplary embodiments of the invention are shown. This invention may, however, be embodied in many different forms and should not be construed as being limited to the exemplary embodiments set forth herein. Rather, these exemplary embodiments are provided so that this disclosure will be thorough and complete, and will fully convey the scope of the invention to those of ordinary skill in the pertinent art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like reference numerals or characters may refer to like elements. As used herein, the term "and/or" includes any and all combinations of one or more of the associated listed items.

It will be understood that, although the terms first, second, third, and the like, may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe the relationship of one element or feature to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention may be described herein with reference to cross-sectional illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the pertinent art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
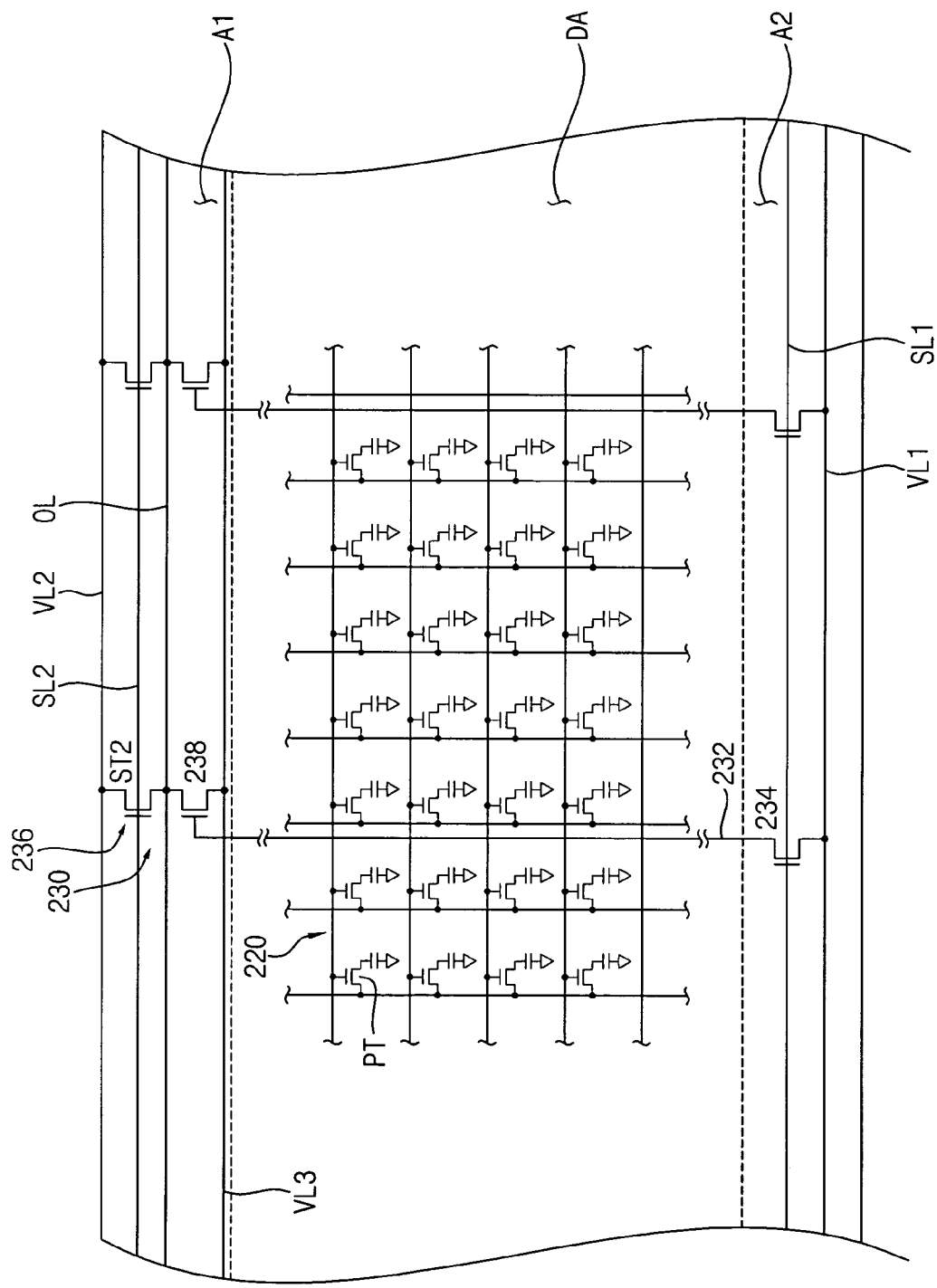
FIG. 2 is a plan view showing a display region and a peripheral region of a display panel shown in FIG. 1.
Figure 3:
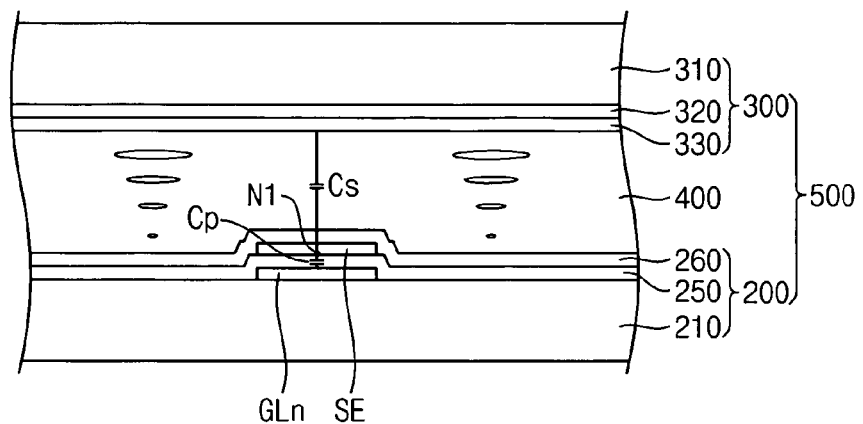
FIG. 3 is a cross-sectional view showing a portion 'A' shown in FIG. 1.

Hereinafter, the present disclosure will be described in detail with reference to the accompanying drawings. FIG. 1 is a plan view showing a display device in accordance with one embodiment of the present disclosure. FIG. 2 is a plan view showing a display region and a peripheral region of a display panel shown in FIG. 1. FIG. 3 is a cross-sectional view showing a portion 'A' shown in FIG. 1.

Referring to FIGS. 1 through 3, a display device 100A includes a display panel 500 having an array substrate 200, an opposite substrate 300 and a liquid crystal layer 400. In FIGS. 1 through 3, the display panel 500 senses an externally provided pressure formed by a finger or a pointer. That is, the display panel 500 performs a touch panel function.

The array substrate 200 includes a first substrate 210, a pixel array 220 and a sensing array 230. The first substrate 210 is divided into a display area or region DA and a peripheral area or region PA. An image is displayed in the display region DA. The peripheral region PA is adjacent to the display region DA.

The pixel array 220 is on the first substrate 210 corresponding to the display region DA, and has a matrix shape. The pixel array 220 includes a plurality of gate lines GL1, GL2, . . . GLn, a plurality of data lines DL1, DL2, DLm and a plurality of pixel thin film transistors PT wherein n and m are natural numbers.

The gate lines GL1, GL2, . . . GLn are extended in a first direction. The data lines DL1, DL2, . . . DLm are extended in a second direction that is substantially perpendicular to the first direction. The gate lines GL1, GL2, GLn are electrically insulated from the data lines DL1, DL2, . . . DLm. Adjacent pixel regions are defined by the gate lines GL1, GL2, . . . GLn and the data lines DL1, DL2, . . . DLm.

The pixel thin film transistors PT are in the pixel regions of the first substrate 210, respectively. Each of the pixel thin film transistors PT includes a gate electrode electrically connected to one of the gate lines GL1, GL2, . . . GLn, a source electrode electrically connected to one of the data lines DL1, DL2, DLm and a drain electrode spaced apart from the source electrode.

A gate insulating layer 250 is on the first substrate 210 having the gate electrode. A passivation layer 260 is on the gate insulating layer 250 having the source and drain electrodes. A plurality of pixel electrodes is on the passivation layer 260.

The sensing array 230 includes a sensing electrode SE, a first thin film transistor 234, a second thin film transistor 236 and a third thin film transistor 238. Alternatively, the sensing array 230 may further include a plurality of the sensing electrodes SE, a plurality of the first thin film transistors 234, a plurality of the second thin film transistors 236 and a plurality of the third thin film transistors 238.

The sensing electrode SE is in the display region DA of the first substrate 210. The sensing electrode SE may include a substantially same material as the source and drain electrodes of the pixel thin film transistors PT. The sensing electrode SE may be substantially in parallel with the data lines DL1, DL2, DLm.

In FIGS. 1 through 3, the sensing electrode SE is substantially in parallel with the data lines DL1, DL2, . . . , DLm. Alternatively, the sensing electrode SE may be substantially in parallel with the gate lines GL1, GL2, . . . , GLn. When the sensing electrode SE is substantially in parallel with the gate lines GL1, GL2, . . . , GLn, the sensing electrode may include a substantially same material as the gate electrode. The sensing electrode SE may also include a substantially same material as the pixel electrodes.

The first, second and third thin film transistors 234, 236 and 238 are in the peripheral region PA of the first substrate 210. The first thin film transistor 234 is in a first region A1 of the peripheral region PA adjacent to a first end portion of each of the data lines DL1, DL2, . . . , DLm. The second and third thin film transistors 236 and 238 are in a second region A2 of the peripheral region PA adjacent to a second end portion of the data lines DL1, DL2, . . . , DLm.

The sensing array 230 may further include a first voltage line VL1, a second voltage line VL2, a third voltage line VL3, a first switching line SL1, a second switching line SL2 and an output line OL. A first voltage Vsensor is applied to the first thin film transistor through the first voltage line VL1. A second voltage VDD is applied to the second thin film transistor 236 through the second voltage line VL2. A third voltage VSS is applied to the third thin film transistor 238 through the third voltage line VL3. A first switching signal S1 is applied to the first thin film transistor 234 through the first switching line SL1. A second switching signal S2 is applied to the second thin film transistor 236 through the second switching line SL2. A sensing signal that is generated by an externally provided pressure on the display panel 500 is applied to the operational amplifier 800 (shown in FIG. 5) through the output line OL.

A gate electrode of the first thin film transistor 234 is electrically connected to the first switching line SL1. A source electrode of the first thin film transistor 234 is electrically connected to the first voltage line VL1. A drain electrode of the first thin film transistor 234 is electrically connected to the sensing electrode SE. A gate electrode of the second thin film transistor 236 is electrically connected to the second switching line SL2. A drain electrode of the second thin film transistor 236 is electrically connected to the second voltage line VL2. A gate electrode of the third thin film transistor 238 is electrically connected to the sensing electrode 232. A source electrode of the third thin film transistor 238 is electrically connected to the third voltage line VL3. A source electrode of the second thin film transistor 236 is electrically connected to a drain electrode of the third thin film transistor 238.

The opposite substrate 300 corresponds to the array substrate 200. The opposite substrate 300 includes a second substrate 310, a color filter layer 320 and a common electrode 330. The color filter layer 320 is on the second substrate 310, and includes a plurality of color filter portions. The common electrode 330 is on the color filter layer 320. The common electrode 330 may include a transparent conductive material.

In addition, the opposite substrate 300 may further include a first black matrix (not shown) and a second black matrix (not shown). The first black matrix is between adjacent color filter portions to block a light between the adjacent color filter portions. The first black matrix corresponds to the display region DA of the array substrate 200. The second black matrix surrounds the first black matrix and the color filter layer 320. The second black matrix corresponds to the peripheral region PA of the array substrate 200. The first, second and third thin film transistors 234, 236 and 238 of the sensing array 230 correspond to the second black matrix.

The liquid crystal layer 400 is interposed between the array substrate 200 and the opposite substrate 300. In particular, the common electrode 330 corresponds to the pixel electrodes so that the liquid crystal layer 400 is interposed between the common electrode 330 and the pixel electrodes. In addition, the common electrode 330 also corresponds to the sensing electrode SE so that the liquid crystal layer 400 is interposed between the common electrode 330 and the sensing electrode SE.

The common electrode 330, the liquid crystal layer 400 and each of the pixel electrodes define a liquid crystal capacitor Clc. In addition, the common electrode 330, the liquid crystal layer 400 and the sensing electrode SE define a sensing capacitor Cs. Various parasite capacitors may be formed in the display panel 500. In FIG. 3, the sensing electrode SE, the gate insulating layer 250 and each of the gate lines GL1, GL2, . . . , GLn form a parasite capacitor Cp. The sensing capacitor Cs is electrically connected to the parasite capacitor Cp through a first node N1. A capacitance of the sensing capacitor Cs is changed with respect to the externally provided pressure.

Figure 4:
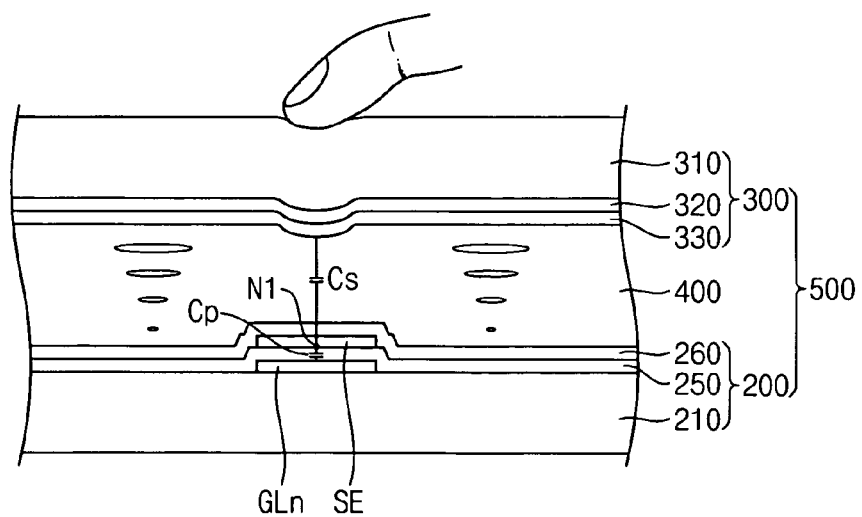
FIG. 4 is a cross-sectional view showing a sensing capacitor for sensing an externally provided pressure shown in FIG. 3.

FIG. 4 is a cross-sectional view showing a sensing capacitor for sensing an externally provided pressure shown in FIG. 3. Referring to FIG. 4, when the display panel 100A corresponding to the sensing capacitor Cs is pressed by the externally provided pressure, the capacitance of the sensing capacitor Cs is changed. In particular, a distance between the common electrode 330 and the sensing electrode SE is decreased so that the capacitance of the sensing capacitor Cs is increased.

$$C = \varepsilon A/d \quad \text{(Equation 1)}$$

'C', '$\varepsilon$', 'A' and 'd' represent a capacitance, a dielectric constant, a surface of each of electrodes and a distance between the electrodes, respectively.

Referring to Equation 1, the capacitance C is increased as the distance d between the electrodes is decreased. Therefore, when the sensing capacitor Cs is pressed by the externally provided pressure, the distance between the common electrode 330 and the sensing electrode SE is decreased so that the sensing capacitor Cs is increased. The sensing array 230 generates the sensing signal corresponding to a location of the externally provided pressure on the display panel 500 to detect the location of the externally provided pressure on the display panel 500.

The display device 100A may further include a gate driving circuit 600 and a data driving circuit 700. The gate driving circuit 600 is electrically connected to the gate lines GL1, GL2, . . . , GLn to apply a plurality of gate signals to the gate lines GL1, GL2, . . . , GLn, in sequence. The gate driving circuit 600 may be directly formed on the first substrate 210 through thin film deposition processes for forming the pixel array 220.

The data driving circuit 700 is electrically connected to the data lines DL1, DL2, . . . , DLm to apply a plurality of data signals to the data lines DL1, DL2, . . . , DLm. The data driving circuit 700 may be a chip mounted on the first substrate 210 corresponding to the peripheral region PA.

Figure 5:
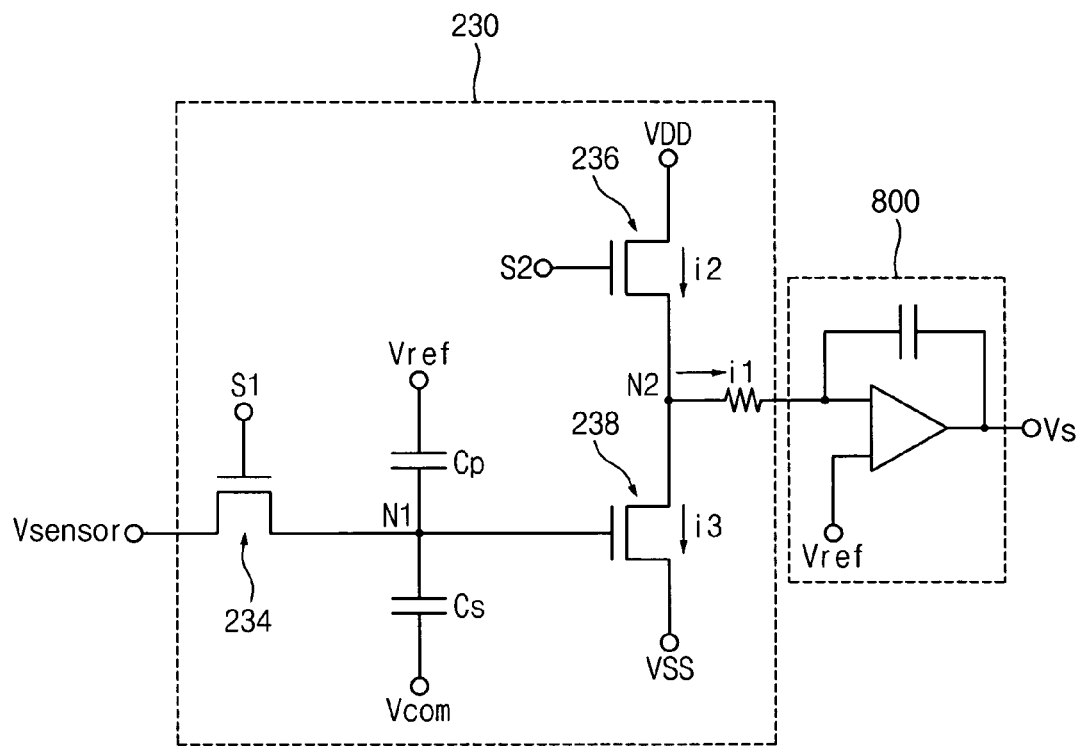
FIG. 5 is a circuit diagram showing a sensing array and an operational amplifier shown in FIG. 1.
Figure 6:
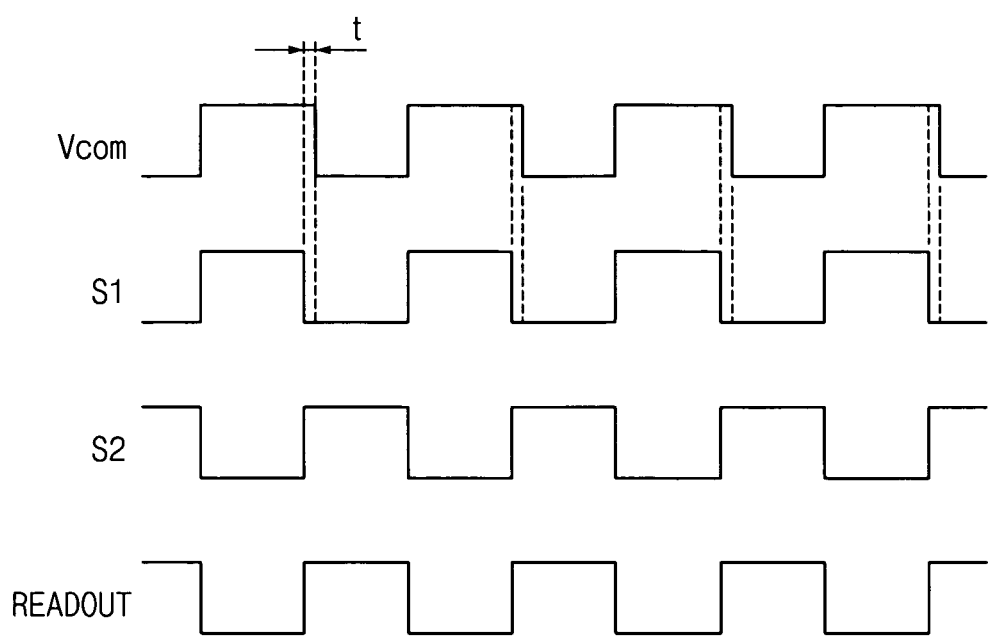
FIG. 6 is a timing diagram showing signals applied to the sensing array shown in FIG. 5.

FIG. 5 is a circuit diagram showing a sensing array and an operational amplifier shown in FIG. 1. FIG. 6 is a timing diagram showing signals applied to the sensing array shown in FIG. 5.

Referring to FIGS. 5 and 6, when the display panel 500 is pressed by a finger or a pointer, the sensing array 230 generates the sensing signal based on the variation of the capacitance of the sensing capacitor Cs. The sensing array 230 includes the sensing electrode SE and the first, second and third thin film transistors 234, 236 and 238.

The operational amplifier 800 is electrically connected to the sensing array 230 to receive the sensing signal. The operational amplifier 800 amplifies the sensing signal to generate a sensing voltage Vs based on the sensing signal. The operational amplifier 800 may be in the data driving circuit 700.

In particular, when the display panel 500 is not pressed, the first thin film transistor 234 is turned on based on the first switching signal S1 and the first voltage Vsensor. In addition, the common voltage Vcom is applied to the common electrode 330 so that the first node N1 is initialized to the first voltage Vsensor by the sensing capacitor Cs.

The common voltage Vcom includes alternating high and low levels. The first switching signal S1 may have a substantially same phase as the common voltage Vcom. For example, when a level of the first switching signal S1 is changed from the low level to the high level, a level of the common voltage Vcom may be simultaneously changed from the low level to the high level. However, the level of the common voltage Vcom may be changed from the high level to the low level, after the level of the first switching signal S1 is changed from the high level to the low level. That is, when the level of each of the common voltage Vcom and the first switching signal S1 is changed from the high level to the low level, a time delay 't' is formed between the common voltage Vcom and the first switching signal S1. The first switching signal S1 is floated so that the first node N1 is floated to the first voltage during the time delay 't'.

When the display panel 500 is pressed by the externally provided pressure, the thickness of the liquid crystal layer 400 is changed, thereby changing the level of the voltage applied to the first node N1. That is, the capacitance of the sensing capacitor Cs is changed by the externally provided pressure. However, a capacitance of the parasite capacitor Cp is not changed by the externally provided pressure so that a sensing capability of the sensing capacitor Cs is not changed by the parasite capacitor Cp.

When the level of the voltage applied to the first node N1 is decreased, an amount of a third current i3 that flows through the third thin film transistor 238 is decreased so that an amount of a first current i1 that is applied to the operational amplifier 800 is increased. In particular, the second thin film transistor 236 is turned on based on the second switching signal S2 and the second voltage VDD so that a second current i2 flows through the second thin film transistor 236. The second switching signal S2 has a substantially opposite phase to the first switching signal S1. That is, when the first switching signal S1 is in the high state, the second switching signal S2 is in the low state. In addition, when the first switching signal S1 is in the low state, the second switching signal S2 is in the high state. Each of the first voltage Vsensor and the second voltage VDD has substantially direct current electric power.

Therefore, the operational amplifier 800 amplifies or transforms the first current i1 to generate the sensing voltage Vs. When the display panel 500 is pressed by the externally provided pressure, the amount of the first current i1 is increased so that the level of the sensing voltage Vs is increased.

The operational amplifier 800 applies the sensing voltage Vs to a controlling part (not shown) of the data driving circuit 700. In particular, the operational amplifier 800 applies the sensing voltage Vs to the controlling part based on a readout signal that is generated from the controlling part. The readout signal has a substantially same phase as the second switching signal S2. When the readout signal is in a high state, the sensing voltage Vs is applied to the controlling part.

The controlling part compares the sensing voltage Vs with an initial voltage to generate location data. When the display panel 500 is not pressed by the externally provided pressure, the operational amplifier 800 generates the initial voltage that has a lower level than the sensing voltage Vs corresponding to the externally provided pressure. That is, the initial voltage may be the sensing voltage Vs without the externally provided pressure. In addition, the controlling part applies the first switching signal S1, the second switching signal S2, the first voltage Vsensor, the second voltage VDD and the third voltage VSS to the sensing array 230.

Figure 7:
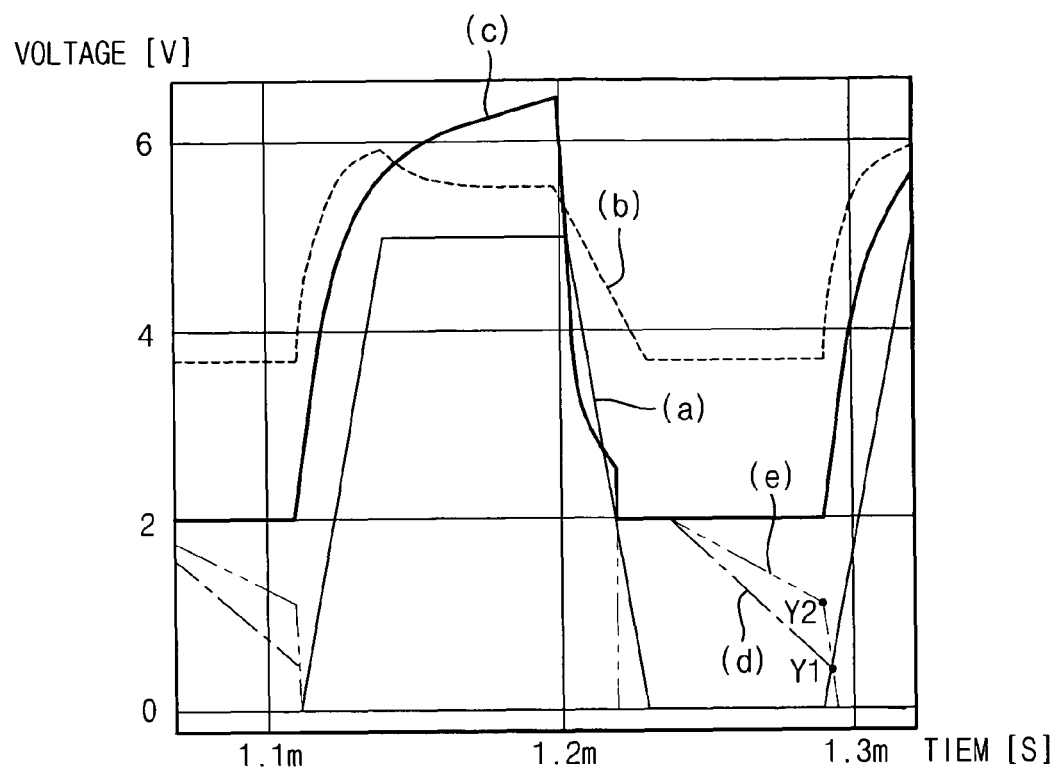
FIG. 7 is a timing diagram showing an output signal outputted from the operational amplifier shown in FIG. 5.

FIG. 7 is a timing diagram showing an output signal outputted from the operational amplifier shown in FIG. 5. Referring to FIGS. 3, 4, 5 and 7, a graph (a) represents the common voltage applied to the common electrode 330. A graph (b) represents the voltage applied to the first node N1. A graph (c) represents the voltage applied to the second node N2. A graph (d) represents the initial voltage outputted from the operational amplifier 800 without the externally provided pressure. A graph (e) represents the sensing voltage Vs outputted from the operational amplifier 800 based on the externally provided pressure.

A first point Y1 of the graph (d) corresponds to about 0.4694V. A second point Y2 of the graph (e) corresponds to about 1.1348V. Therefore, when the display panel 500 is pressed by the externally provided pressure, the level of the sensing voltage Vs outputted from the operational amplifier 800 is increased by about 600 mV.

In FIGS. 1 through 7, the sensing voltage Vs is increased by the externally provided pressure on the display panel 500. Alternatively, the sensing voltage Vs may be decreased by the externally provided pressure on the display panel 500.

Figure 8:
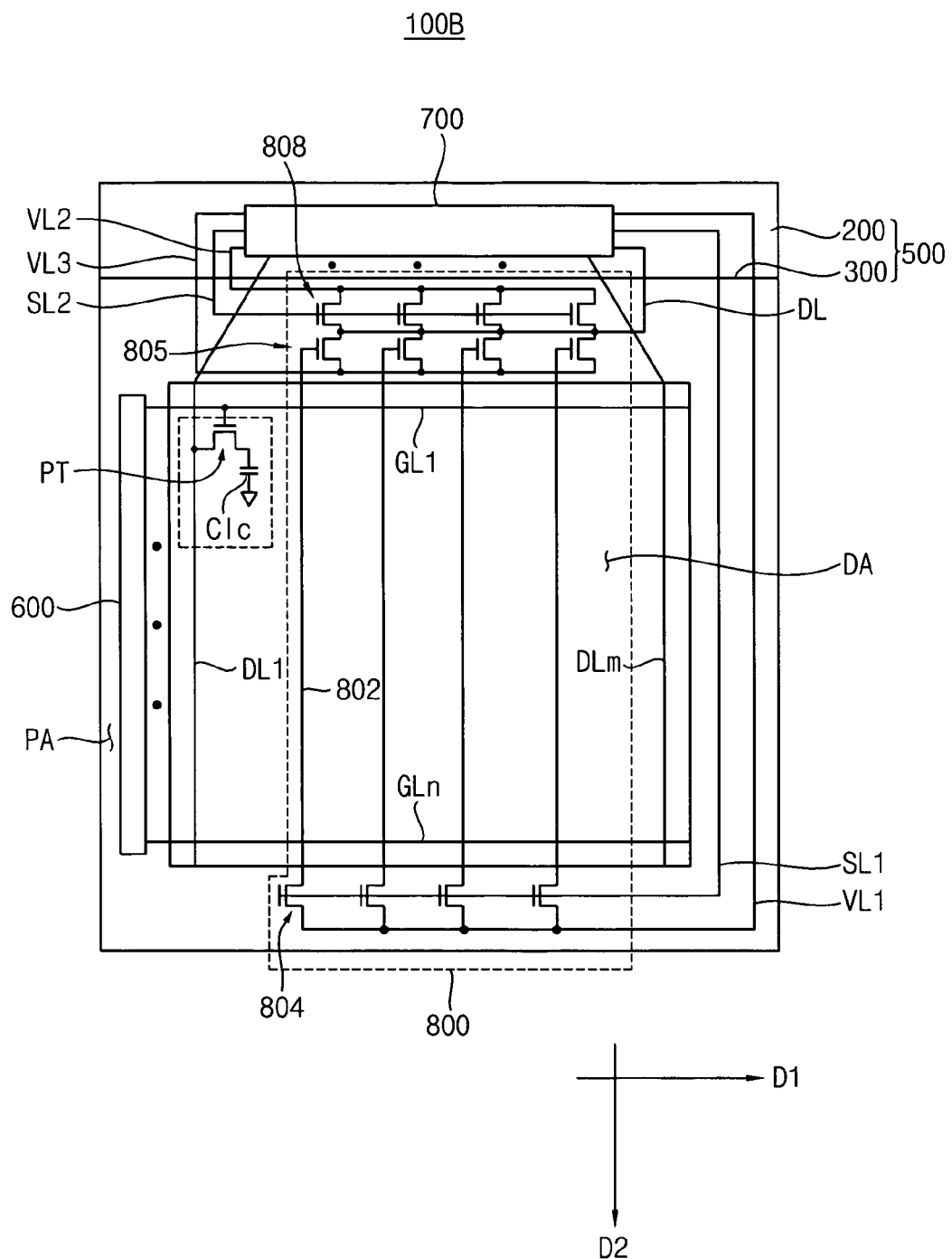
FIG. 8 is a plan view showing a display device in accordance with another embodiment of the present disclosure.
Figure 9:
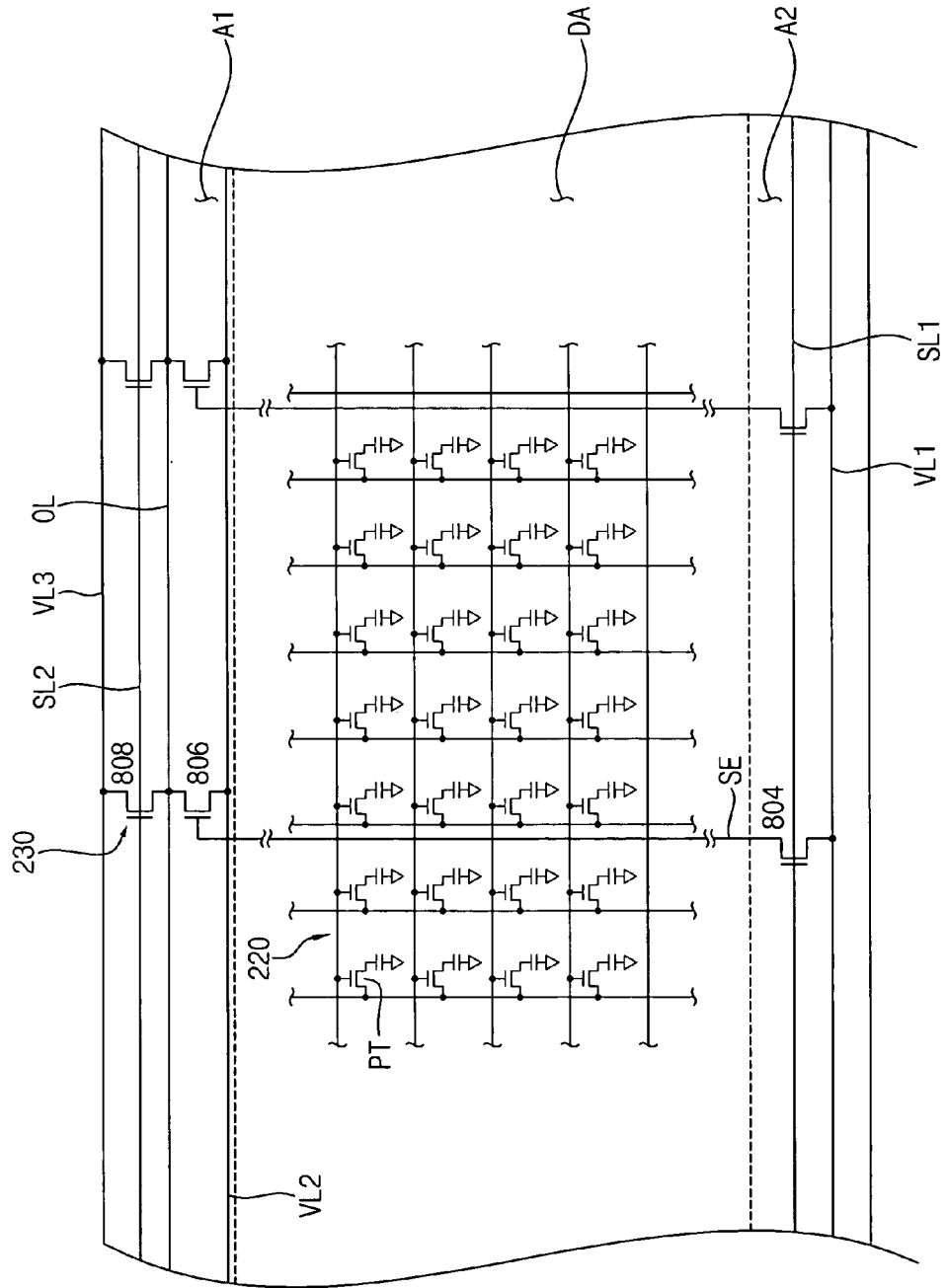
FIG. 9 is a plan view showing a display region and a peripheral region of a display panel shown in FIG. 8.

FIG. 8 is a plan view showing a display device in accordance with another embodiment of the present disclosure. FIG. 9 is a plan view showing a display region and a peripheral region of a display panel shown in FIG. 8.

The display device of FIGS. 8 and 9 is substantially same as in FIGS. 1 through 7 except an array substrate. Thus, the same reference numerals will be used to refer to the same or like parts as those described in FIGS. 1 through 7 and any further explanation concerning the above elements will be omitted.

Referring to FIGS. 8 and 9, the display device 100B includes a display panel 500 having an array substrate 200, an opposite substrate 300 and a liquid crystal layer 400. In FIGS. 8 and 9, the display panel 500 senses an externally provided pressure formed by a finger or a pointer. That is, the display panel 500 performs a touch panel function.

The array substrate 200 includes a first substrate 210, a pixel array 220 and a sensing array 800. The first substrate 210 is divided into a display region DA and a peripheral region PA. An image is displayed on the display region DA. The peripheral region PA is adjacent to the display region DA.

The sensing array 800 includes a sensing electrode SE, a first thin film transistor 804, a second thin film transistor 806 and a third thin film transistor 808. Alternatively, the sensing array 800 may further include a plurality of the sensing electrodes SE, a plurality of the first thin film transistors 804, a plurality of the second thin film transistors 806 and a plurality of the third thin film transistors 808.

The sensing electrode SE is in the display region DA of the first substrate 210. The sensing electrode SE may include a substantially same material as the source and drain electrodes of the pixel thin film transistors PT. The sensing electrode SE may be substantially in parallel with the data lines DL1, DL2, DLm.

In FIGS. 8 and 9, the sensing electrode SE is substantially in parallel with the data lines DL1, DL2, . . . , DLm. Alternatively, the sensing electrode SE may be substantially in parallel with the gate lines GL1, GL2, . . . , GLn. When the sensing electrode SE is substantially in parallel with the gate lines GL1, GL2, . . . , GLn, the sensing electrode may include a substantially same material as the gate electrode. The sensing electrode SE may also include a substantially same material as the pixel electrodes.

The first, second and third thin film transistors 804, 806 and 808 are in the peripheral region PA of the first substrate 210. The first thin film transistor 804 is in a first region A1 of the peripheral region PA adjacent to a first end portion of each of the data lines DL1, DL2, . . . , DLm. The second and third thin film transistors 806 and 808 are in a second region A2 of the peripheral region PA adjacent to a second end portion of the data lines DL1, DL2, . . . , DLm.

The sensing array 800 may further include a first voltage line VL1, a second voltage line VL2, a third voltage line VL3, a first switching line SL1, a second switching line SL2 and an output line OL. A first voltage Vsensor is applied to the first thin film transistor 804 through the first voltage line VL1. A second voltage VDD is applied to the second thin film transistor 806 through the second voltage line VL2. A third voltage VSS is applied to the third thin film transistor 808 through the third voltage line VL3. A first switching signal S1 is applied to the first thin film transistor 804 through the first switching line SL1. A second switching signal S2 is applied to the third thin film transistor 808 through the second switching line SL2. A sensing signal that is generated by an externally provided pressure on the display panel 500 is applied to an operational amplifier 900 (shown in FIG. 10) through the output line OL.

A gate electrode of the first thin film transistor 804 is electrically connected to the first switching line SL1. A drain electrode of the first thin film transistor 804 is electrically connected to the first voltage line VL1. A source electrode of the first thin film transistor 804 is electrically connected to the sensing electrode SE. A gate electrode of the second thin film transistor 806 is electrically connected to the sensing electrode SE. A drain electrode of the second thin film transistor 806 is electrically connected to the second voltage line VL2. A gate electrode of the third thin film transistor 808 is electrically connected to the second switching line SL2. A source electrode of the third thin film transistor 808 is electrically connected to the third voltage line VL3. A source electrode of the second thin film transistor 806 is electrically connected to a drain electrode of the third thin film transistor 808 and the output line OL.

Figure 10:
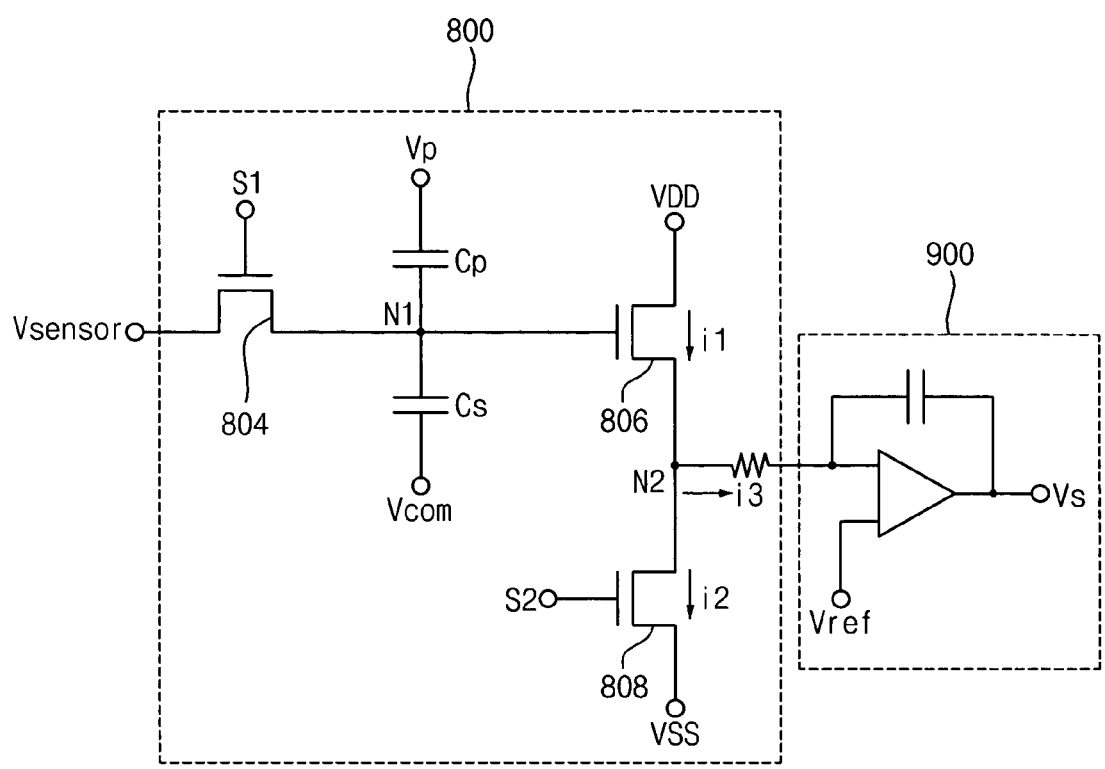
FIG. 10 is a circuit diagram showing a sensing array and an operational amplifier shown in FIG. 8.

FIG. 10 is a circuit diagram showing a sensing array and an operational amplifier shown in FIG. 8. Referring to FIGS. 8 through 10, when the display panel 500 is pressed by a finger or a pointer, the sensing array 800 generates a sensing signal based on the variation of the capacitance of the sensing capacitor Cs.

A common electrode 330 of the opposite substrate 300, the liquid crystal layer 400 and the sensing electrode SE define a sensing capacitor Cs. Various parasite capacitors may be formed in the display panel 500. In FIGS. 8 through 10, the sensing electrode SE, the gate insulating layer 250 and each of the gate lines GL1, GL2, . . . , GLn form a parasite capacitor Cp. The sensing capacitor Cs is electrically connected to the parasite capacitor Cp through a first node N1.

The operational amplifier 900 is electrically connected to the sensing array 800 to receive the sensing signal. The operational amplifier 900 amplifies the sensing signal to generate a sensing voltage Vs based on the sensing signal. The operational amplifier 900 may be in the data driving circuit 700.

In particular, when the display panel 500 is not pressed, the first thin film transistor 804 is turned on based on the first switching signal S1 and the first voltage Vsensor. In addition, the common voltage Vcom is applied to the common electrode 330 so that the first node N1 is initialized to the first voltage Vsensor by the sensing capacitor Cs.

The common voltage Vcom includes alternating high and low levels. The first switching signal S1 may have a substantially same phase as the common voltage Vcom. For example, when a level of the first switching signal S1 is changed from the low level to the high level, a level of the common voltage Vcom may be simultaneously changed from the low level to the high level. However, the level of the common voltage Vcom may be changed from the high level to the low level, after the level of the first switching signal S1 is changed from the high level to the low level. That is, when the level of each of the common voltage Vcom and the first switching signal S1 is changed from the high level to the low level, a time delay 't' is formed between the common voltage Vcom and the first switching signal S1. The first switching signal S1 is floated so that the first node N1 is floated to the first voltage during the time delay 't'.

When the display panel 500 is pressed by the externally provided pressure, the thickness of the liquid crystal layer 400 is changed, thereby changing the level of the voltage applied to the first node N1. That is, the capacitance of the sensing capacitor Cs is changed by the externally provided pressure. However, a capacitance of the parasite capacitor Cp is not changed by the externally provided pressure so that a sensing capability of the sensing capacitor Cs is not changed by the parasite capacitor Cp.

When the level of the voltage applied to the first node N1 is decreased, an amount of a first current i1 that flows through the second thin film transistor 806 is decreased. The second voltage VDD is applied to the second thin film transistor 806. In particular, the third thin film transistor 808 is turned on based on the second switching signal S2 and a third voltage VSS. The second switching signal S2 has a substantially opposite phase to the first switching signal S1. That is, when the first switching signal S1 is in the high state, the second switching signal S2 is in the low state. In addition, when the first switching signal S1 is in the low state, the second switching signal S2 is in the high state. Each of the first, second and third voltages Vsensor, VDD and VSS has substantially direct current electric power.

When the third thin film transistor 808 is turned on, a second current i2 that flows through the third thin film transistor 808 has a constant level so that a third current i3 is applied to the operational amplifier 900 based on the first current i1. The amount of the first current i1 is changed with respect to a capacitance of the sensing capacitor Cs. In particular, the amount of the third current i3 may be substantially equal to a difference between the first and second currents i1 and i2. That is, the second current i2 is the constant current, and the first current i1 varies based on the externally provided pressure so that the third current i3 that is applied to the operational amplifier 900 is changed based on the variation of the first current i1. Therefore, the third thin film transistor 808 extracts the variation corresponding to the externally provided pressure from the first current i1 to generate the third current i3. That is, the third thin film transistor 808 may filter the first current i1 to remove a portion of the first current i1, which does not include the location data, thereby improving a sensitivity of the sensing capacitor Cs. Therefore, the operational amplifier 900 amplifies the third current i3 to generate the sensing voltage Vs.

The operational amplifier 900 applies the sensing voltage Vs to a controlling part (not shown) of the data driving circuit 700. In particular, the operational amplifier 900 applies the sensing voltage Vs to the controlling part based on a readout signal that is generated from the controlling part. The readout signal has a substantially same phase as the second switching signal S2. When the readout signal is at a high state, the sensing voltage Vs is applied to the controlling part.

The controlling part compares the sensing voltage Vs with an initial voltage to generate location data. When the display panel 500 is not pressed by the externally provided pressure, the operational amplifier 900 generates the initial voltage that has a lower level than the sensing voltage Vs corresponding to the externally provided pressure. That is, the initial voltage may be the sensing voltage Vs without the externally provided pressure. In addition, the controlling part applies the first switching signal S1, the second switching signal S2, the first voltage Vsensor, the second voltage VDD and the third voltage VSS to the sensing array 800.

According to the display device shown in FIGS. 8 through 10, the first current i1 that varies based on the variation of the sensing capacitor Cs is applied to the operational amplifier 900 through the third thin film transistor 808, thereby decreasing a size of the operational amplifier 900. Therefore, a power consumption of the operational amplifier 900 is decreased.

Figure 11:
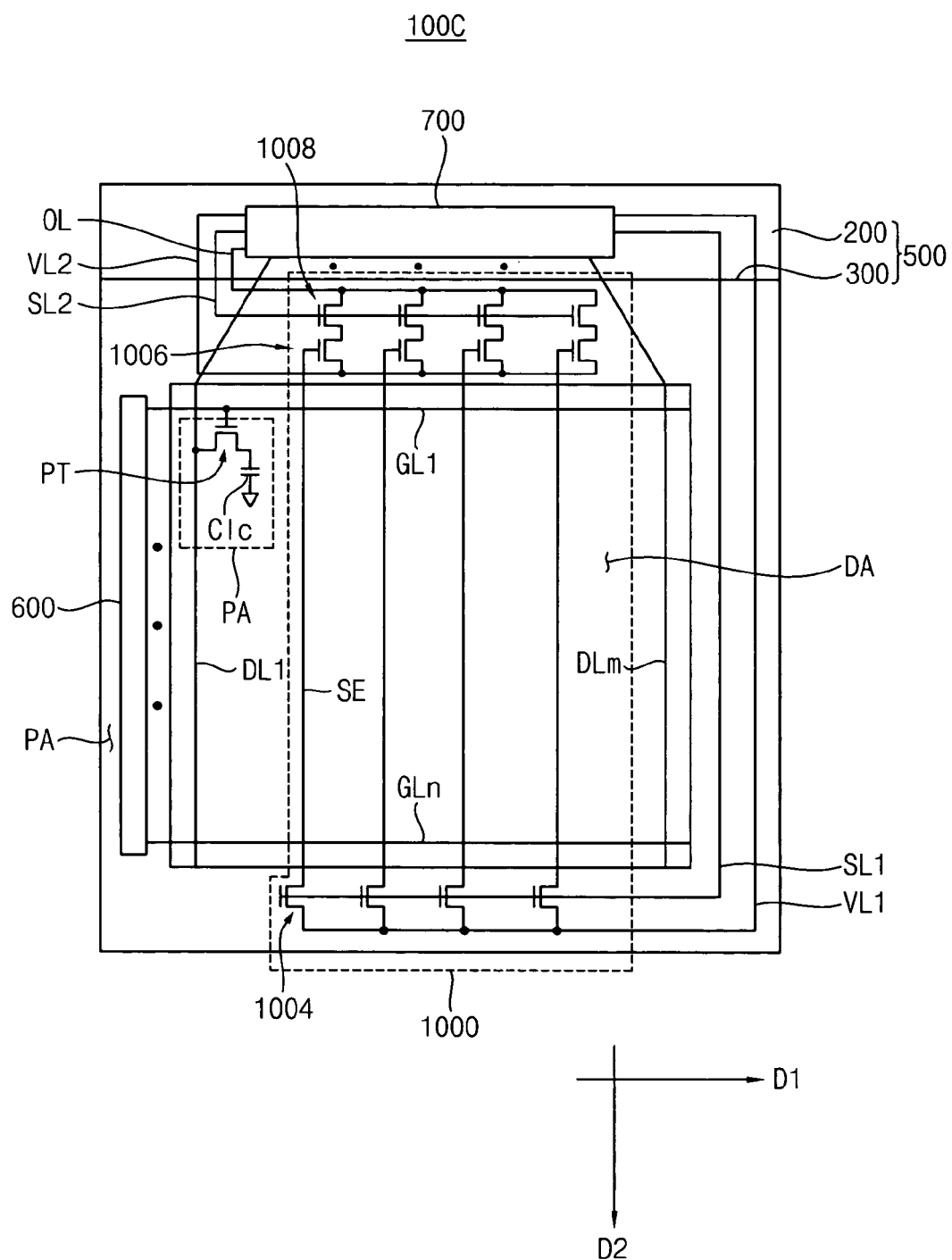
FIG. 11 is a plan view showing a display device in accordance with another embodiment of the present disclosure.

FIG. 11 is a plan view showing a display device in accordance with another embodiment of the present disclosure.

Figure 12:
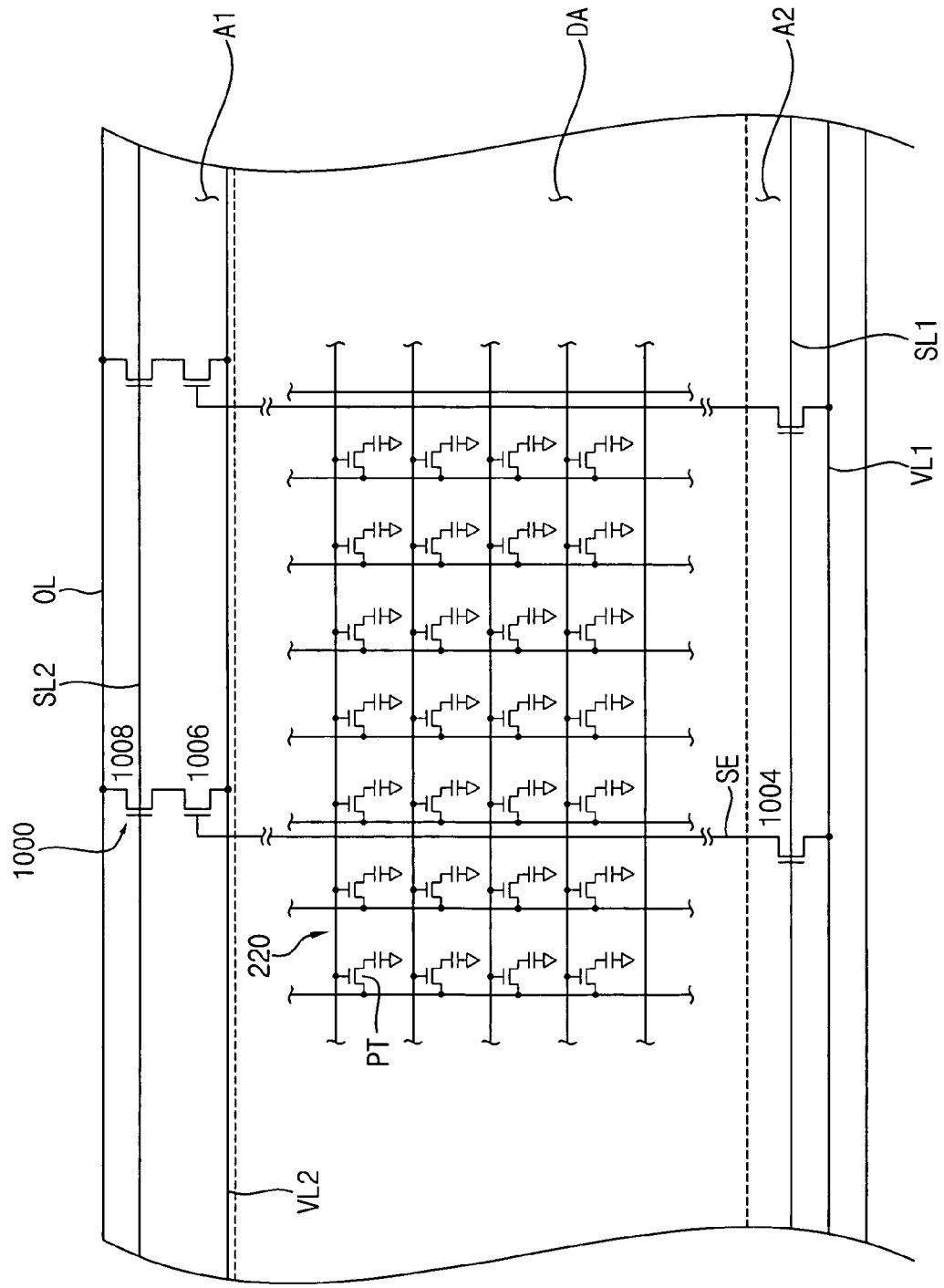
FIG. 12 is a plan view showing a display region and a peripheral region of a display panel shown in FIG. 11.

FIG. 12 is a plan view showing a display region and a peripheral region of a display panel shown in FIG. 11.

The display device of FIGS. 11 and 12 is substantially same as in FIGS. 1 through 7 except an array substrate. Thus, the same reference numerals will be used to refer to the same or like parts as those described in FIGS. 1 through 7 and any further explanation concerning the above elements will be omitted.

Referring to FIGS. 11 and 12, the display device 100C includes a display panel 500 having an array substrate 200, an opposite substrate 300 and a liquid crystal layer 400. In FIGS. 11 and 12, the display panel 500 senses an externally provided pressure formed by a finger or a pointer. That is, the display panel 500 performs a touch panel function.

The array substrate 200 includes a first substrate 210, a pixel array 220 and a sensing array 1000. The first substrate 210 is divided into a display region DA and a peripheral region PA. An image is displayed in the display region DA. The peripheral region PA is adjacent to the display region DA.

The sensing array 1000 includes a sensing electrode SE, a first thin film transistor 1004, a second thin film transistor 1006 and a third thin film transistor 1008. Alternatively, the sensing array 1000 may further include a plurality of the sensing electrodes SE, a plurality of the first thin film transistors 1004, a plurality of the second thin film transistors 1006 and a plurality of the third thin film transistors 1008.

The sensing electrode SE is in the display region DA of the first substrate 210. The first, second and third thin film transistors 1004, 1006 and 1008 are in the peripheral region PA of the first substrate 210. The first thin film transistor 1004 is in a first region A1 of the peripheral region PA adjacent to a first end portion of each of the data lines DL1, DL2, ..., DLm. The second and third thin film transistors 1006 and 1008 are in a second region A2 of the peripheral region PA adjacent to a second end portion of the data lines DL1, DL2, ..., DLm.

The sensing array 1000 may further include a first voltage line VL1, a second voltage line VL2, a first switching line SL1, a second switching line SL2 and an output line OL. A first voltage Vsensor is applied to the first thin film transistor 1004 through the first voltage line VL1. A second voltage VDD is applied to the second thin film transistor 1006 through the second voltage line VL2. A first switching signal S1 is applied to the first thin film transistor 1004 through the first switching line SL1. A second switching signal S2 is applied to the third thin film transistor 1008 through the second switching line SL2. A sensing signal that is generated by an externally provided pressure on the display panel 500 is applied to an operational amplifier 1000 (shown in FIG. 13) through the output line OL.

A gate electrode of the first thin film transistor 1004 is electrically connected to the first switching line SL1. A source electrode of the first thin film transistor 1004 is electrically connected to the first voltage line VL1. A drain electrode of the first thin film transistor 1004 is electrically connected to the sensing electrode SE. A gate electrode of the second thin film transistor 1006 is electrically connected to the sensing electrode SE. A drain electrode of the second thin film transistor 1006 is electrically connected to the second voltage line VL2. A gate electrode of the third thin film transistor 1008 is electrically connected to the second switching line SL2. A drain electrode of the third thin film transistor 1008 is electrically connected to the source electrode of the second thin film transistor 1006. A source electrode of the third thin film transistor 1008 is electrically connected to the output line OL.

Figure 13:
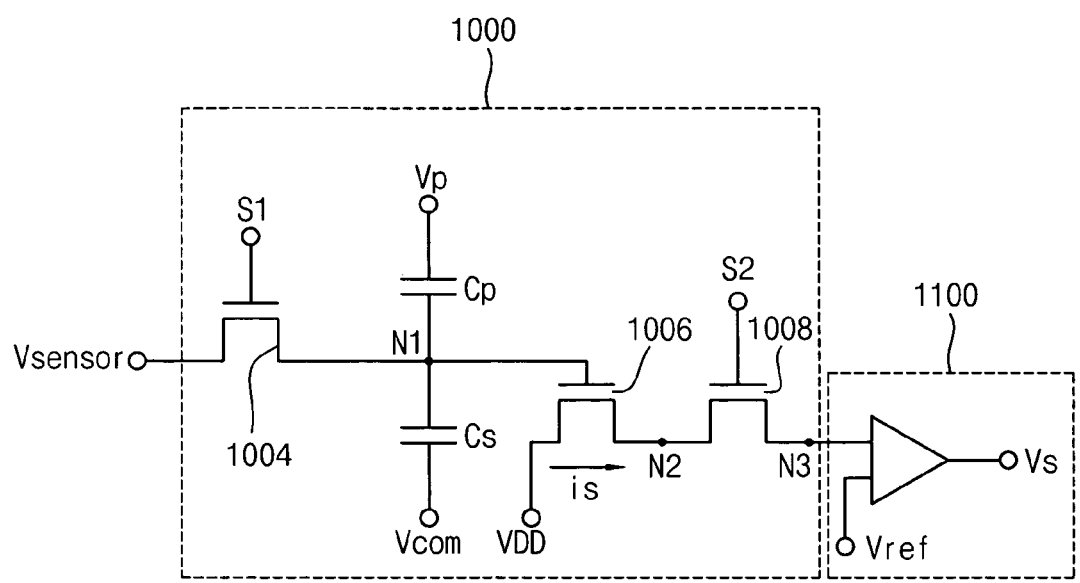
FIG. 13 is a circuit diagram showing a sensing array and an operational amplifier shown in FIG. 11.

FIG. 13 is a circuit diagram showing a sensing array and an operational amplifier shown in FIG. 11. Referring to FIGS. 11 through 13, when the display panel 500 is pressed by a finger or a pointer, the sensing array 1000 generates a sensing signal based on the variation of the capacitance of the sensing capacitor Cs.

A common electrode 330 of the opposite substrate 300, the liquid crystal layer 400 and the sensing electrode SE define a sensing capacitor Cs. Various parasite capacitors may be formed in the display panel 500. In FIGS. 8 through 10, the sensing electrode SE, the gate insulating layer 250 and each of the gate lines GL1, GL2, ... GLn form a parasite capacitor Cp. The sensing capacitor Cs is electrically connected to the parasite capacitor Cp through a first node N1.

The operational amplifier 1100 is electrically connected to the sensing array 1000 to receive the sensing signal. The operational amplifier 1100 amplifies the sensing signal to generate a sensing voltage Vs based on the sensing signal. The operational amplifier 1100 may be in the data driving circuit 700.

In particular, when the display panel 500 is not pressed, the first thin film transistor 1004 is turned on based on the first switching signal S1 and the first voltage Vsensor. In addition, the common voltage Vcom is applied to the common electrode 330 so that the first node N1 is initialized to the first voltage Vsensor by the sensing capacitor Cs.

The common voltage Vcom includes alternating high and low levels. The first switching signal S1 may have a substantially same phase as the common voltage Vcom. For example, when a level of the first switching signal S1 is changed from the low level to the high level, a level of the common voltage Vcom may be simultaneously changed from the low level to the high level. However, the level of the common voltage Vcom may be changed from the high level to the low level, after the level of the first switching signal S1 is changed from the high level to the low level. That is, when the level of each of the common voltage Vcom and the first switching signal S1 is changed from the high level to the low level, a time delay 't' is formed between the common voltage Vcom and the first switching signal S1.

The first switching signal S1 is floated so that the first node N1 is floated to the first voltage during the time delay 't'. When the display panel 500 is pressed by the externally provided pressure, the thickness of the liquid crystal layer 400 is changed, thereby changing the level of the voltage applied to the first node N1. That is, the capacitance of the sensing capacitor Cs is changed by the externally provided pressure. However, a capacitance of the parasite capacitor Cp is not changed by the externally provided pressure so that a sensing capability of the sensing capacitor Cs is not changed by the parasite capacitor Cp.

When the level of the voltage applied to the first node N1 is decreased, an amount of a sensing current 'is' that flows through the second thin film transistor 1006 is decreased. The sensing current 'is' is applied to the operational amplifier 1100. The operational amplifier 1100 amplifies the sensing current 'is' to generate a sensing voltage Vs. The operational amplifier 1100 applies the sensing voltage Vs to a controlling part (not shown) of the data driving circuit 700 based on a readout signal that is generated from the controlling part.

The third thin film transistor 1008 is turned on based on the second switching signal S2. The second switching signal S2 has a substantially opposite phase to the first switching signal S1. That is, when the first switching signal S1 is in the high state, the second switching signal S2 is in the low state. In addition, when the first switching signal S1 is in the low state, the second switching signal S2 is in the high state. Each of the first and second voltages Vsensor and VDD has substantially direct current electric power.

The readout signal may have a substantially same phase as the second switching signal S2. Therefore, when the readout signal is in a high state, the third thin film transistor 1008 performs a sampling function on the sensing voltage Vs that is applied to the controlling part. In addition, the operational amplifier 1100 may not be operated when the readout signal is in a low state.

When the second switching signal S2 is in the high state, the third thin film transistor 1008 is turned on so that the second node N2 is electrically connected to the third node N3. Therefore, the second thin film transistor 1006 is electrically connected to the operational amplifier 1100 so that the sensing current 'is' is applied to the operational amplifier 1100. That is, when the second switching signal S2 is in the high state, the readout signal is in the high state so that the operational amplifier 1100 applies the sensing voltage Vs to the data driving circuit 700.

When the second switching signal S2 is in the low state, the third thin film transistor 1008 is turned off so that the second node N2 is electrically disconnected from the third node N3. Therefore, the second thin film transistor 1006 is electrically disconnected from the operational amplifier 1100 so that the sensing current 'is' is not applied to the operational amplifier 1100. In particular, when the second switching signal S2 is in the low state, the readout signal is in the low state so that the operational amplifier 1100 does not apply the sensing voltage Vs to the data driving circuit 700. That is, when the second switching signal S2 is in the low state, the sampling function is not performed.

When the sensing voltage Vs is not applied to the data driving circuit 700 by the third thin film transistor 1008, the operational amplifier 1100 is not operated. Therefore, when the readout signal is in the low state, the operational amplifier 1100 is not operated, thereby decreasing a power consumption of the display device.

In FIGS. 1 through 13, the sensing array is used for a liquid crystal display (LCD) device. Alternatively, the sensing array may be used for various display devices having substrates and an insulating layer interposed between the substrates.

According to exemplary embodiments of the present disclosure, the sensing array includes the first, second and third thin film transistors and the sensing electrode. The common electrode, the liquid crystal layer and the sensing electrode form the sensing capacitor. The sensing electrode is in the display region of the display panel. The first, second and third thin film transistors are in the peripheral region of the display panel.

Therefore, the sensing array detects the variation of the capacitance of the sensing capacitor to generate the information data. The capacitance of the sensing capacitor is changed by the externally provided pressure on the display panel to change the current that flows through the sensing array. Thus, the display panel performs the touch panel function. Further, the size and thickness of the display device may be decreased.

In addition, the sensing electrode is in the display region, and the first, second and third thin film transistors are in the peripheral region, thereby increasing an opening rate of the display panel. Therefore, an image display quality of the display device is improved.

This invention has been described with reference to exemplary embodiments. It shall be understood, however, that many alternative modifications and variations will be apparent to those having ordinary skill in the pertinent art in light of the foregoing description. Accordingly, the present invention embraces all such alternative modifications and variations as fall within the spirit and scope of the appended claims.

What is claimed is:

1. A sensing circuit for sensing an externally provided pressure on a panel including a first substrate, a second substrate corresponding to the first substrate to have an opposite electrode, and an insulating layer interposed between the first and second substrates, the sensing circuit comprising:
   a sensing capacitor including a sensing electrode on the first substrate, the insulating layer and the opposite electrode, the sensing electrode being connected to a first node;
   a first switching element comprising:
      a first source electrode receiving a first voltage;
      a first gate electrode receiving a first switching signal; and
      a first drain electrode electrically connected to the first node;
   a second switching element outputting a second current, the second switching element comprising:
      a second source electrode receiving a second voltage;
      a second gate electrode receiving a second switching signal; and
      a second drain electrode electrically connected to a second node; and
   a third switching element outputting a third current, the third switching element comprising:
      a third source electrode receiving a third voltage;
      a third gate electrode electrically connected to the sensing electrode at the first node; and
      a third drain electrode electrically connected to the second switching element at the second node,
   wherein a capacitance of the sensing capacitor is increased by the externally provided pressure, and a voltage level of the first node is decreased by the increased capacitance of the sensing capacitor, and
   wherein an amount of the third current is decreased by the decreased voltage level of the first node.

2. The sensing circuit of claim 1, wherein the second switching signal has a substantially opposite phase to the first switching signal.

3. The sensing circuit of claim 1, further comprising:
   a first voltage line electrically connected to the first switching element to transmit the first voltage;
   a second voltage line electrically connected to the second switching element to transmit the second voltage;
   a third voltage line electrically connected to the third switching element to transmit the third voltage;
   a first switching line electrically connected to the first switching element to transmit the first switching signal; and
   a second switching line electrically connected to the second switching element to transmit the second switching signal.

4. The sensing circuit of claim 1, further comprising an operational amplifier receiving a first current that corresponds to a difference between the second current and the third current, the operational amplifier amplifies the first current.

5. The sensing circuit of claim 1, wherein an amount of the second current is constant.

6. A display device comprising:
   a display panel including:
      an array substrate;
      an opposite substrate corresponding to the array substrate to have a common electrode receiving a common voltage; and
      a liquid crystal layer interposed between the array substrate and the opposite substrate, the liquid crystal layer varying a thickness based on an externally provided pressure on the display panel;

a sensing array in the display panel to generate a sensing signal based on the variation of the thickness of the liquid crystal layer, the sensing array including:

a sensing capacitor including a sensing electrode on the array substrate, the liquid crystal layer and the common electrode, the sensing electrode being connected to a first node;

a first switching element comprising:
  a first source electrode receiving a first voltage;
  a first gate electrode receiving a first switching signal; and
  a first drain electrode electrically connected to the first node;

a second switching element outputting a second current, the second switching element comprising:
  a second source electrode receiving a second voltage;
  a second gate electrode receiving a second switching signal; and
  a second drain electrode electrically connected to a second node; and a third switching element outputting a third current, the third switching element comprising:
  a third source electrode receiving a third voltage;
  a third gate electrode electrically connected to the sensing electrode at the first node; and
  a third drain electrode electrically connected to the second switching element at the second node; and a controlling part on the array substrate to generate location data based on a sensing signal corresponding to a difference between the second current and the third current, wherein a capacitance of the sensing capacitor is increased by the externally provided pressure, and a voltage level of the first node is decreased by the increased capacitance of the sensing capacitor, and wherein an amount of the third current is decreased by the decreased voltage level of the first node.

7. The display device of claim 6, wherein the second switching signal has a substantially opposite phase to the first switching signal.

8. The display device of claim 6, wherein the array substrate further comprises:

a substrate including a display region in which the sensing electrode is formed and a peripheral region adjacent to the display region, the first, second and third switching elements being formed in the peripheral region; and a pixel array on the substrate corresponding to the display region.

9. The display device of claim 8, wherein the pixel array comprises:

a gate line;

a data line crossing the gate line, the data line being electrically insulated from the gate line;

a pixel switching element electrically connected to the gate and data lines; and a pixel electrode electrically connected to the pixel switching element.

10. The display device of claim 9, wherein the sensing electrode comprise a substantially same material as the gate line or the data line.

11. The display device of claim 9, wherein the sensing electrode is substantially in parallel with the data line, the first switching element is in a first region of the peripheral region adjacent to a first end portion of the data line, and the second and third switching elements are in a second region of the peripheral region adjacent to a second end portion of the data line.

12. The display device of claim 9, wherein the sensing electrode comprises a substantially same material as the pixel electrode.

13. The display device of claim 6, wherein the sensing array further comprises:

a first voltage line electrically connected to the first switching element to transmit the first voltage;

a second voltage line electrically connected to the second switching element to transmit the second voltage;

a third voltage line electrically connected to the third switching element to transmit the third voltage;

a first switching line electrically connected to the first switching element to transmit the first switching signal; and a second switching line electrically connected to the second switching element to transmit the second switching signal.

14. The display device of claim 6, further comprising an operational amplifier that amplifies a level of the sensing signal to apply the amplified sensing signal to the controlling part.

* * * * *